UNITED STATES PATENT OFFICE.

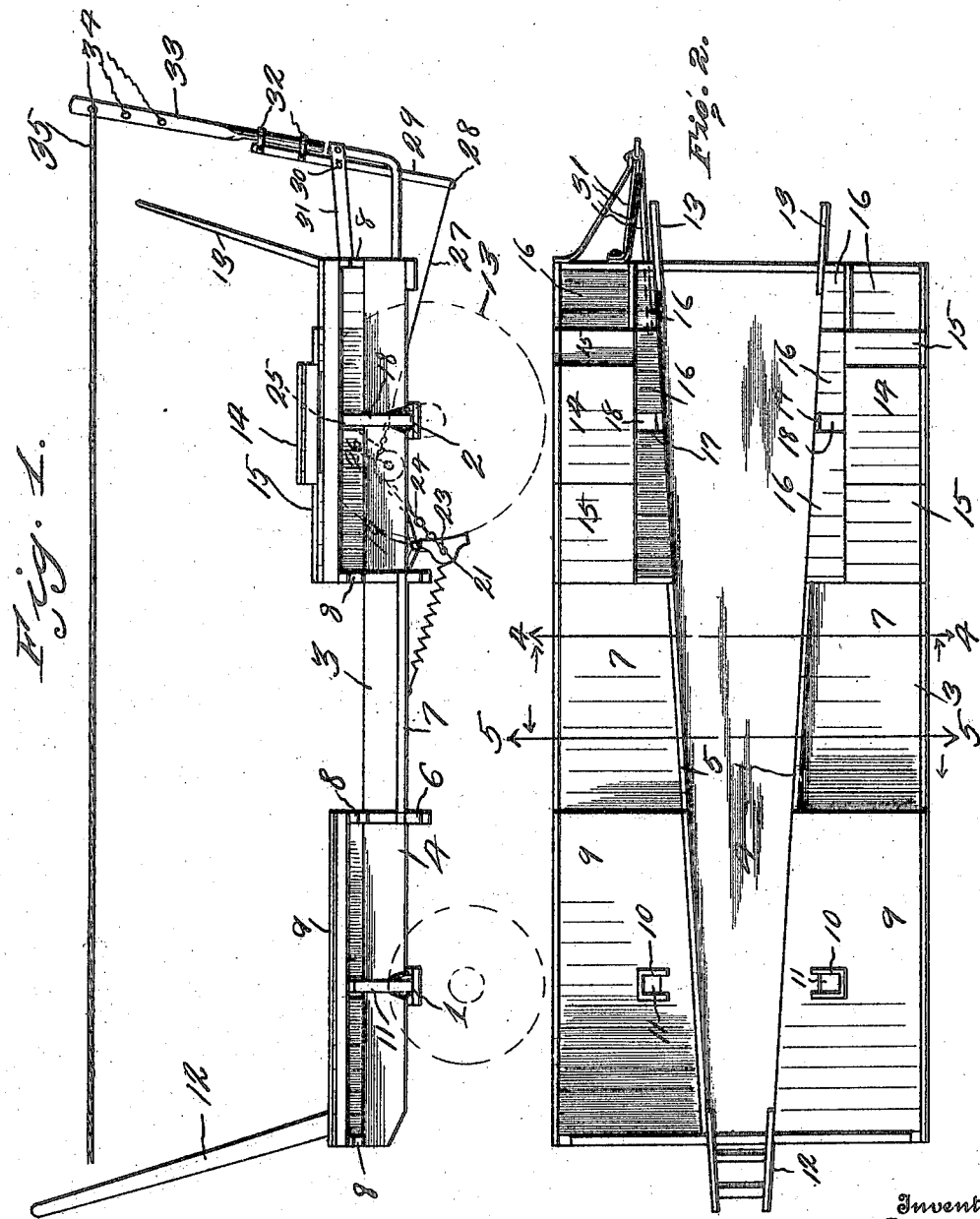

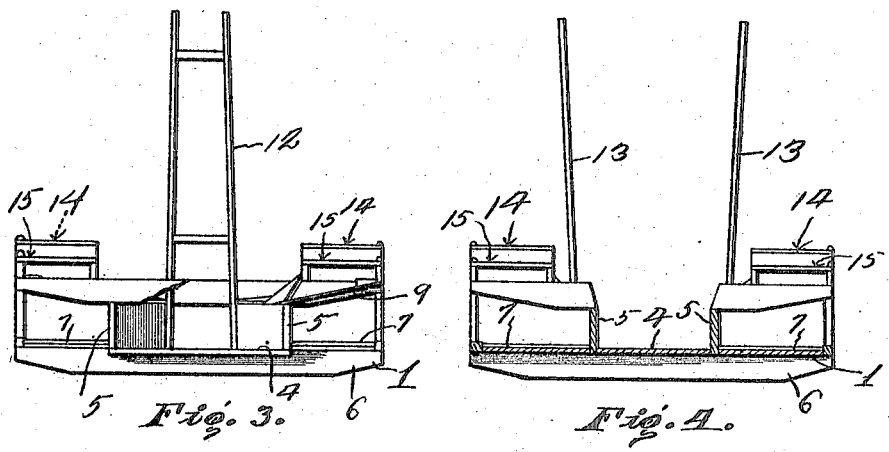
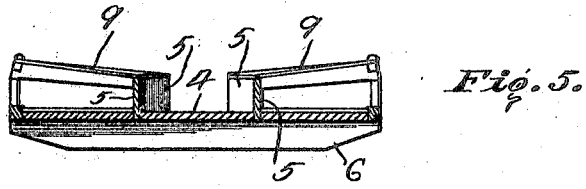
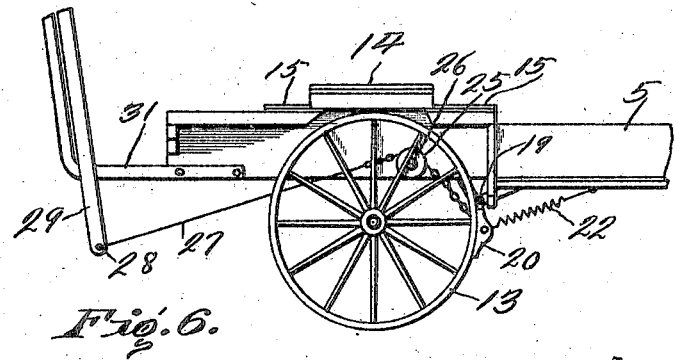

CHARLES W. WORDEN, OF DALLAS CITY, ILLINOIS.

HAYRACK.

1,417,125.   Specification of Letters Patent.   Patented May 23, 1922.

Application filed June 22, 1920. Serial No. 390,785.

*To all whom it may concern:*

Be it known that I, CHARLES W. WORDEN, a citizen of the United States, residing at Dallas City, in the county of Hancock, State of Illinois, have invented a new and useful Hayrack; and I do hereby declare the following to be a full, clear, and exact description of the invention, such as will enable others skilled in the art to which it appertains to make and use the same.

The invention relates to hay racks and has for its object to provide a device of this character comprising a longitudinally disposed body member having longitudinally disposed upwardly extending sills, said body member being adapted to be received by the bolsters of a wagon running gear and forming means whereby grain will be prevented from dropping on the ground and consequent loss of the same.

A further object is to provide platforms on each side of the front end of the body member and inclining downwardly and inwardly on which the material may be banked and stacked, also to provide centrally disposed lowered platforms between the wheels, and on which platforms during the initial loading men may stand for properly disposing the material on the rack. Also to provide built up portions at the rear end of the rack, which built up portions are disposed over the rear wheels.

A further object is to provide lever and cable connections with the brakes at the rear end of the wagon as a whole whereby said brakes may be operated from the front end of the wagon.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the hay rack.

Figure 2 is a top plan view.

Figure 3 is a rear view of the rack, part of one of the sills being broken away to better illustrate the structure.

Figure 4 is a transverse sectional view taken on line 4—4 of Figure 2.

Figure 5 is a transverse sectional view taken on line 5—5 of Figure 2.

Figure 6 is a side elevation of the rear end of the hay rack showing the brake mechanism.

Referring to the drawings, the numeral 1 designates the forward bolster and 2 the rear bolster of the running gear. The hay rack 3 is provided with a body portion 4 formed by longitudinally disposed sills 5 which extend rearwardly and outwardly thereby forming a depression longitudinally of the body as a whole into which grain which may be dislodged during hauling will fall and be collected, therefore loss of grain is prevented. Extending transversely under the body portion 4 are spaced sills 6, on which sills boards 7 are attached which form platforms on which the loader of the vehicle may stand during a loading operation. Transversely disposed and secured to the upper edges of the sills 5 are bars 8 and on the bars 8 at the forward end of the rack, downwardly and inwardly inclined platforms 9 are disposed and on which platforms 9 the hay or other material is adapted to be stacked. Platforms 9 are provided with apertures 10 for the reception of the stakes 11 carried by the bolster 1. Extending upwardly and forwardly from the forward end of the body member 4 is a member 12 for holding the hay against forward displacement and to which member one end of the conventional form of pole may be secured if so desired. The rear end of the body member 4 is provided with upwardly extending members 13, which prevent rearward displacement of the material on the rack. The rear wheels 13 are arched by built-up members 14 which members are provided with flat surfaces 15 and inclined surfaces 16, which incline inwardly so that the grain that may become dislodged from the material which is being hauled will roll down these inclined surfaces into the body member 4, where it will be held against loss.

From the above it will be seen that a hay rack is provided which may be easily and quickly loaded, and one wherein the loss of grain is reduced to a minimum. The rear end of the hay rack 3 is provided with apertures 17 which receive the upper ends of the stakes 18 carried by the rear bolster 2. The rack as a whole being prevented from displacement on the running gear by bolting or otherwise securing the same to the bolsters of the running gear.

Pivotally mounted as at 19 on the under side of the longitudinal sills 5 are brake shoes 20, which brake shoes are carried by a brake beam 21 and are normally held out of engagement with the wheels 13 by means of coiled springs 22. Connected to the brake beam as at 23 is a chain 24, which chain passes over a pulley 25 pivotally mounted at 26 on the side of the frame 5. The chain has connected to its end a rod 27, the end 28 of which is connected to a pivoted brake lever 29. The brake lever 29 is pivoted as at 30 in a rearwardly extending bracket 31 carried by the rear end of the hay rack. Lever 29 is provided with yokes 32 for the reception of an extension bar 33 in any one of the apertures 34 of which a cable 35 may be attached. It will be seen that the driver who is at the forward end of the hay rack can control the brake by pulling on the cable 35 when it is desired to brake the wheel. It will also be seen that when the cable 35 is released that the springs 22 will pull the brake shoes out of engagement with the wheels 13.

By placing the cross sills 6 below the longitudinally disposed sills 5, it will be seen that said sills 6 will be out of the way of the man working on the body during an unloading operation with a pitchfork. Also that by so locating sills 6 that there will be absolutely no danger of the pitch fork catching in the sills and interfering with the unloading.

The invention having been set forth what is claimed as new and useful is :—

A hay rack comprising a pair of spaced converging sills adapted to rest upon bolsters of a wagon running gear, said sills having their lower edges connected together by a horizontally disposed bottom extending throughout the length and width of the space between the sills, a rectangular shaped frame surrounding the sills and having its longitudinal sides spaced from the sills, outwardly and upwardly extending platforms carried by the sills adjacent its ends and having their adjacent sides spaced from each other, horizontally disposed platforms extending outwardly from the lower edges of the sills substantially centrally thereof and apertures in the outwardly and upwardly inclined platforms for the reception of wagon stakes whereby lateral movement of the hay rack on the wagon bolsters will be prevented.

In testimony whereof I have signed my name to this specification in the presence of two subscribing witnesses.

CHARLES W. WORDEN.

Witnesses:
ARTHUR T. LOOMIS,
BESSIE DE HAVEN.